United States Patent [19]

Gammache

[11] Patent Number: 4,999,750
[45] Date of Patent: Mar. 12, 1991

[54] FLASHLIGHT WITH ROTATABLE HEAD ASSEMBLY

[76] Inventor: Richard J. Gammache, 1564 Mission Rd., Lancaster, Pa. 17601

[21] Appl. No.: 507,918

[22] Filed: Mar. 12, 1990

Related U.S. Application Data

[62] Division of Ser. No. 382,401, Jul. 20, 1989, Pat. No. 4,914,555.

[51] Int. Cl.$^5$ .............................................. F21L 7/00
[52] U.S. Cl. .................................................... 362/203
[58] Field of Search ................................ 362/203, 202

[56] References Cited

FOREIGN PATENT DOCUMENTS 534202 2/1941 United Kingdom ................ 362/203

*Primary Examiner*—Allen M. Ostrager

[57] ABSTRACT

A flashlight includes a cylindrical casing containing a battery. A bulb is slidably disposed in a socket member carried in the casing, and a head assembly is rotatably mounted on one end of the casing. The bulb has an annular flange forming an electrical terminal. The head assembly has a preloaded pressure pad arranged for engaging the bulb flange. When the head assembly is rotated in one direction, the bulb is moved toward the battery and the bulb flange is moved into contact with another electrical terminal in the casing. This closes an electrical circuit connecting the battery and the bulb, illuminating the bulb. A spring carried by the socket member is disposed between the battery and the bulb. When the head assembly is rotated in the opposite direction, the spring urges the bulb away from the battery and moves the bulb flange out of contact with the electrical terminal in the casing. This opens the electrical circuit between the battery and the bulb, extinguishing the bulb.

6 Claims, 7 Drawing Sheets

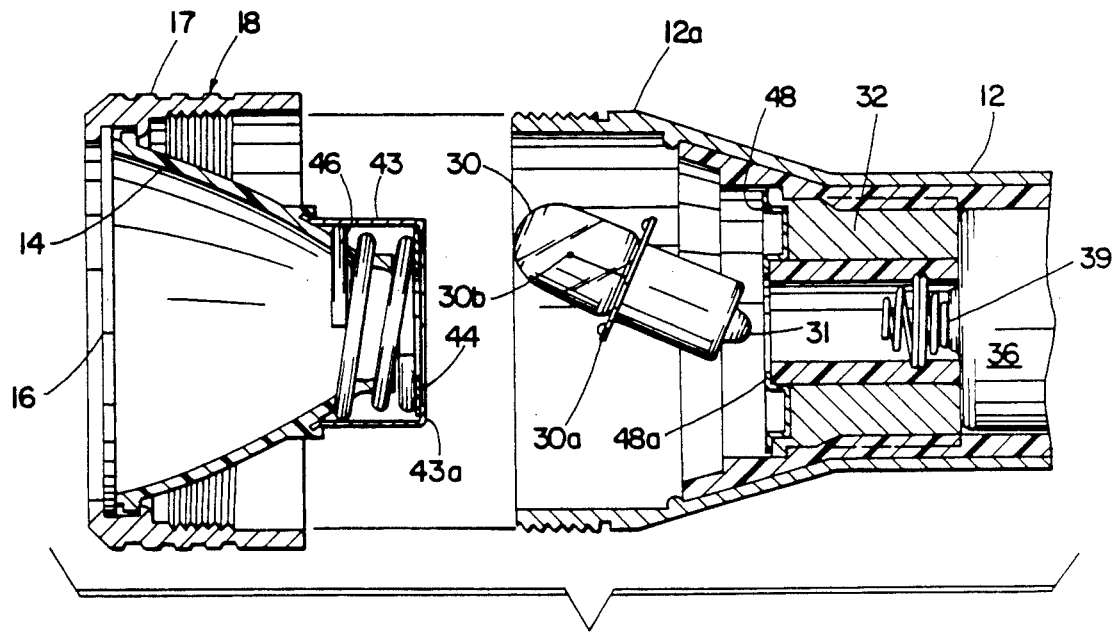
Fig. la
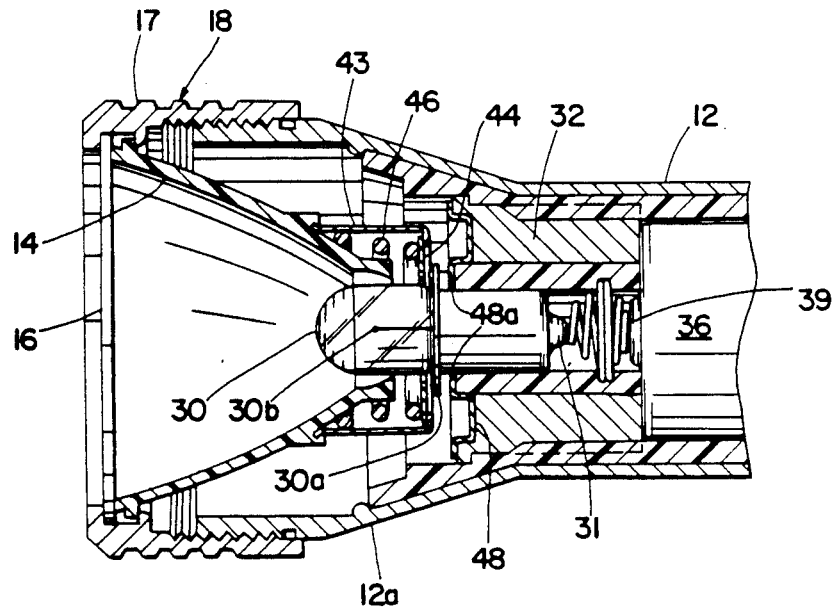
Fig. lb 4,999,750

FLASHLIGHT WITH ROTATABLE HEAD ASSEMBLY

This is a division of application Ser. No. 382,401 filed July 20, 1989, now U.S. Pat. No. 4,914,555.

BACKGROUND OF THE INVENTION

This invention relates generally to flashlights and, in particular, to a flashlight with a rotatable head assembly.

U.S. Pat. No. 4,725,932 discloses a flashlight having a cylindrical casing containing batteries. A head assembly is rotatably mounted on the upper end of the casing while a tail cap closes the lower end of the casing. A bulb, which is retained in the casing upper end, is turned on and off by rotating the head assembly. When the head assembly is removed from the casing, the bulb remains on. Also, the tail cap and the batteries must be removed from the casing in order to remove the bulb.

SUMMARY OF THE INVENTION

The present invention provides a flashlight including a casing containing a battery, a bulb disposed in the casing and having an annular flange thereon forming an electrical terminal, and a head assembly rotatably mounted on one end of the casing and having means arranged for engaging the annular bulb flange for moving the bulb in a first direction toward the battery and for moving the annular bulb flange into contact with another electrical terminal disposed in the casing thereby completing an electrical circuit connecting the battery and the bulb so that the bulb is illuminated. The head assembly forms no part of this electrical circuit. A spring is disposed between the battery and the bulb for urging the bulb in a second direction away from the battery and for moving the annular bulb flange out of contact with the electrical terminal in the casing so that the bulb is extinguished.

DESCRIPTION OF THE PREFERRED EMBODIMENT

Figure 1C:
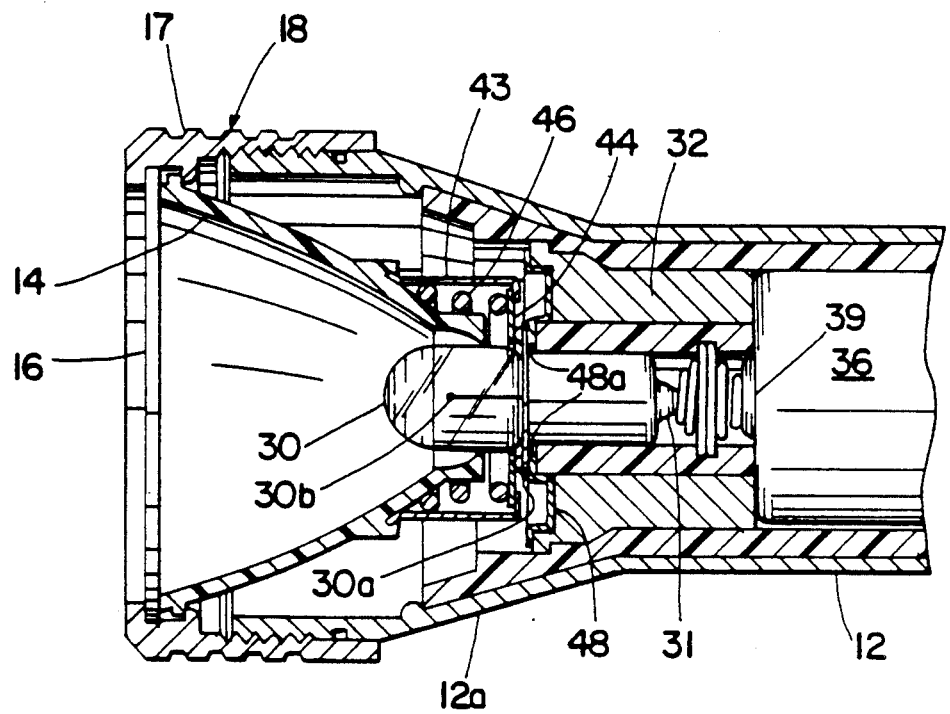
FIG. 1c is an enlarged sectional view similar to FIG. 1b when the head assembly has been rotated in another direction to turn on the flashlight.

A flashlight 10 incorporating the preferred embodiment of the present invention includes a cylindrical casing 12 flared open at one end 12a to receive a reflector 14 formed of plastic. The reflector 14 and a lens 16 are permanently retained in a cap 17 to form a head assembly 18 which is threaded onto the casing flared end 12a. The other end 12b of the casing 12 receives a partition member 20 having a pair of slots through which a pair of prongs 22 may be extended and retracted by rotating a knob 24 that is permanently secured to the partition member 20 by a guide member 26. Upon being fully extended by rotating the knob 24, the prongs 22 make electrical contact with two conductive leads 28 mounted in the partition member 20. When fully extended, the prongs 22 may be plugged into an alternating current electrical receptacle of preferably 120 volts.

The partition member 20 and the knob 24 are formed of nonconductive material and have corresponding external contours including matching flat surfaces which serve as tactual reminders of the extended and retracted positions of the prongs 22. In other words, with the prongs 22 in their extended and retracted positions, the flat surfaces on the knob 24 are aligned with the corresponding flat surfaces on the partition member 20. Thus, any misalignment of these matching flat surfaces indicates that the prongs 22 are not fully extended or retracted. It will be understood that the knob 24 may be rotated in either direction (i.e. clockwise or counter-clockwise) to extend or retract the prongs 22. Also, the slots in the partition member 20, through which the prongs 22 are extended and retracted, are formed in one of the flat surfaces thereof.

The flashlight 10 is turned on and off and also focused by rotating the head assembly 18 relative to the casing 12. A bulb 30 is removably supported in a socket member 32 which is permanently mounted in an insulating shell 34 that encases rechargeable batteries 36. Socket member 32 and shell 34 are made of nonconductive material. Socket member 32 forms a protective barrier between the batteries 36 and the bulb 30. An electronic circuit board 38 is connected electrically to the batteries 36 by a first terminal 40 and a spring 42. The circuit board 38 may also be connected electrically to the prongs 22 by the leads 28 when the prongs 22 are fully extended. The partition member 20 has internal rails molded therein for guiding the circuit board 38 during assembly of flashlight 10 and for supporting the circuit board 38 in its permanent seated position within flashlight 10. A double conical spring 39 carried in the socket member 32 electrically connects the batteries 36 with the bulb 30.

According to the present invention, the head assembly 18 includes a sleeve 43 permanently secured at one end to the reflector 14 and a pressure pad 44 carried within the other end of the sleeve 42. A spring 46 normally urges the pad 44 against an annular flange 43a on the sleeve 43. The pad 44 is arranged to engage an annular flange 30a on the bulb 30 in order to move the bulb 30 toward the batteries 36 until flange 30a is moved into electrical contact with an inner flange 48a of a second terminal 48 which is disposed in a groove 33 in the socket member 32. It will be understood that the spring 39 normally urges the bulb 30 away from the batteries 36 so that flange 30a is moved out of contact with the terminal inner flange 48a. Spring 39 also maintains electrical contact between batteries 36 and the center terminal 31 of bulb 30. An O-ring 50 is disposed in a groove 13 in the flared end 12a of the casing 12 to provide a hermetic seal between casing 12 and head assembly 18. To replace the bulb 30, the head assembly 18 is unthreaded from the casing 12 and the bulb 30 is lifted out of the socket member 32. A new bulb 30 is inserted in the socket member 32 and the head assembly 18 is threaded back onto the casing 12. The head assembly 18 consists of reflector 14, lens 16, cap 17, sleeve 43, pressure pad 44, spring 46 and O-ring 50.

Figure 1D:
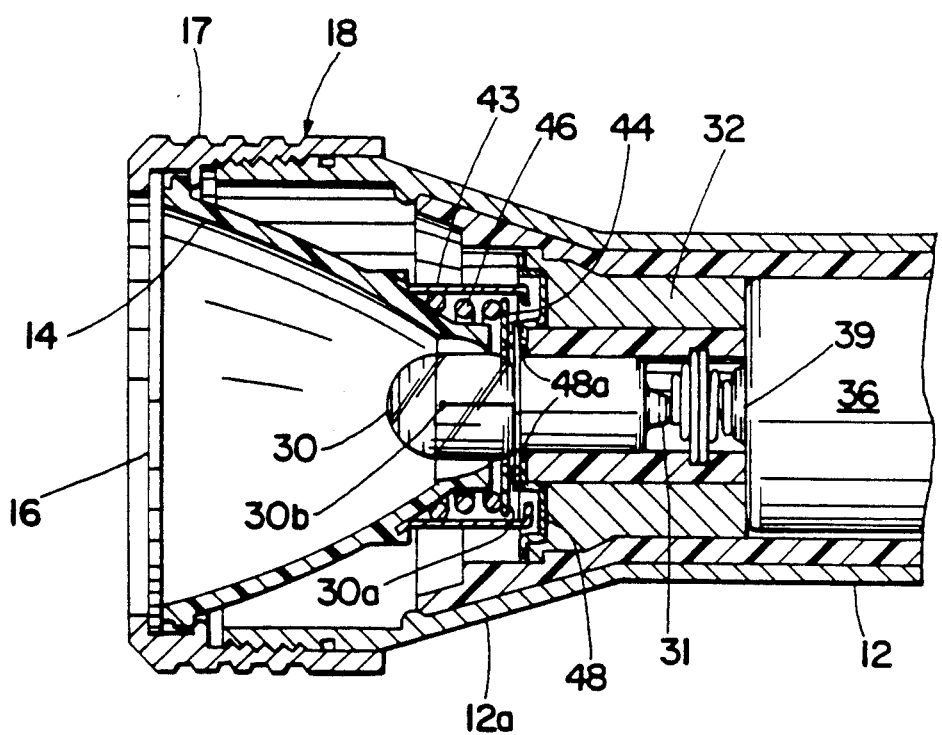
FIG. 1 is a sectional view of a flashlight with a rotatable head assembly incorporating the preferred embodiment of the present invention.
FIG. 1a is an enlarged exploded view of part of the flashlight shown in FIG. 1.
FIG. 1b is an enlarged sectional view of part of the flashlight shown FIG. 1 when the head assembly has been rotated in a direction to turn off the flashlight.
FIG. 1e is an enlarged sectional view similar to FIG. 1c with the flashlight turned on and the head assembly being rotated for focusing.
Figure 1:
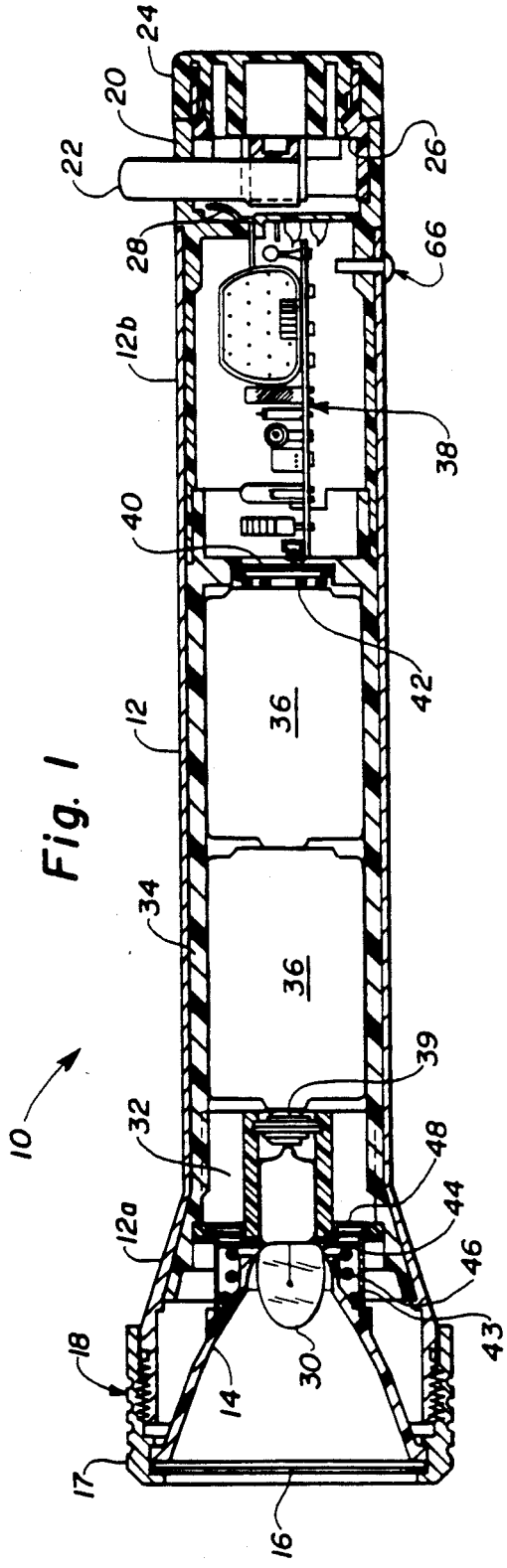
Figure 2:
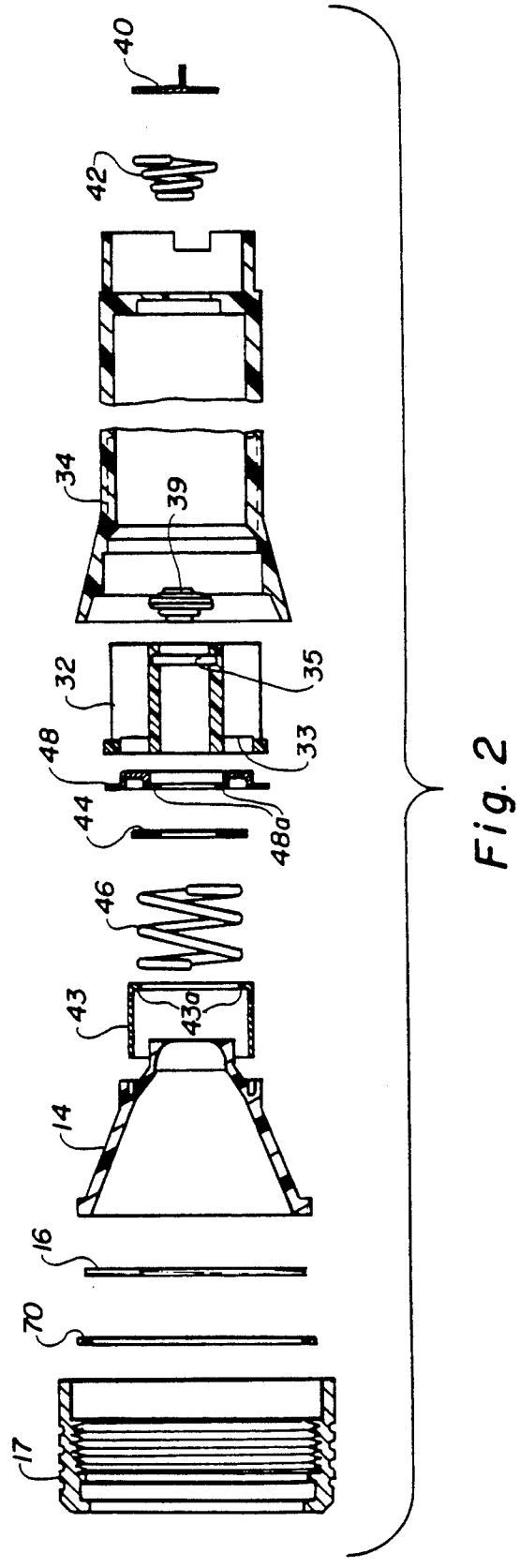
Figs. 2, 3, 4, 5 and 6 are exploded views showing various parts of the flashlight of FIG. 1.
Figure 3:
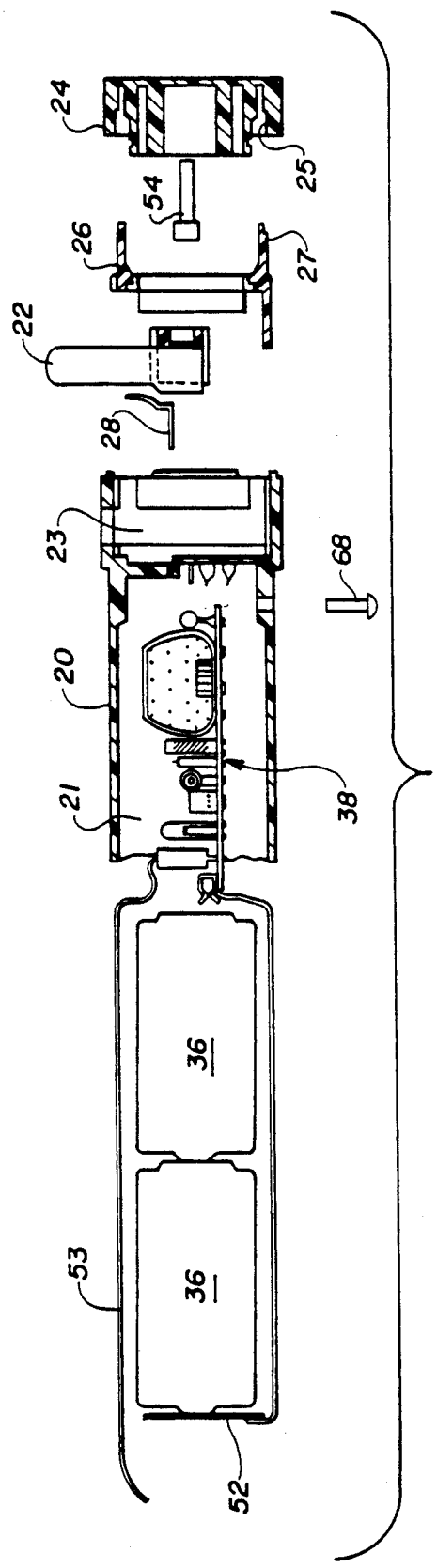
Figure 4:
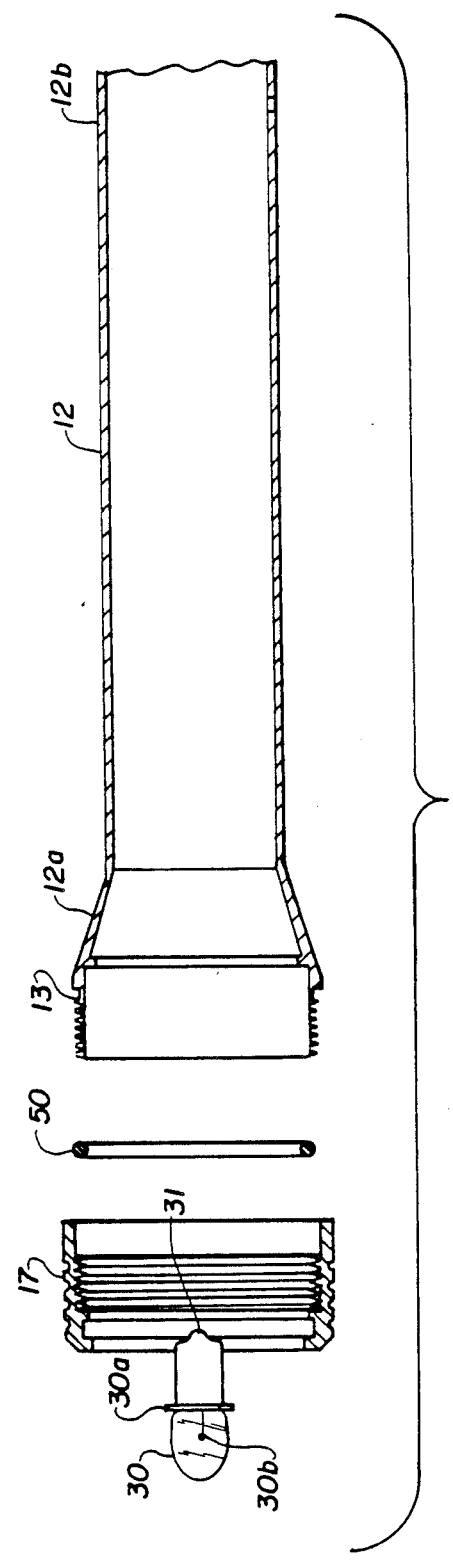
Figure 5:
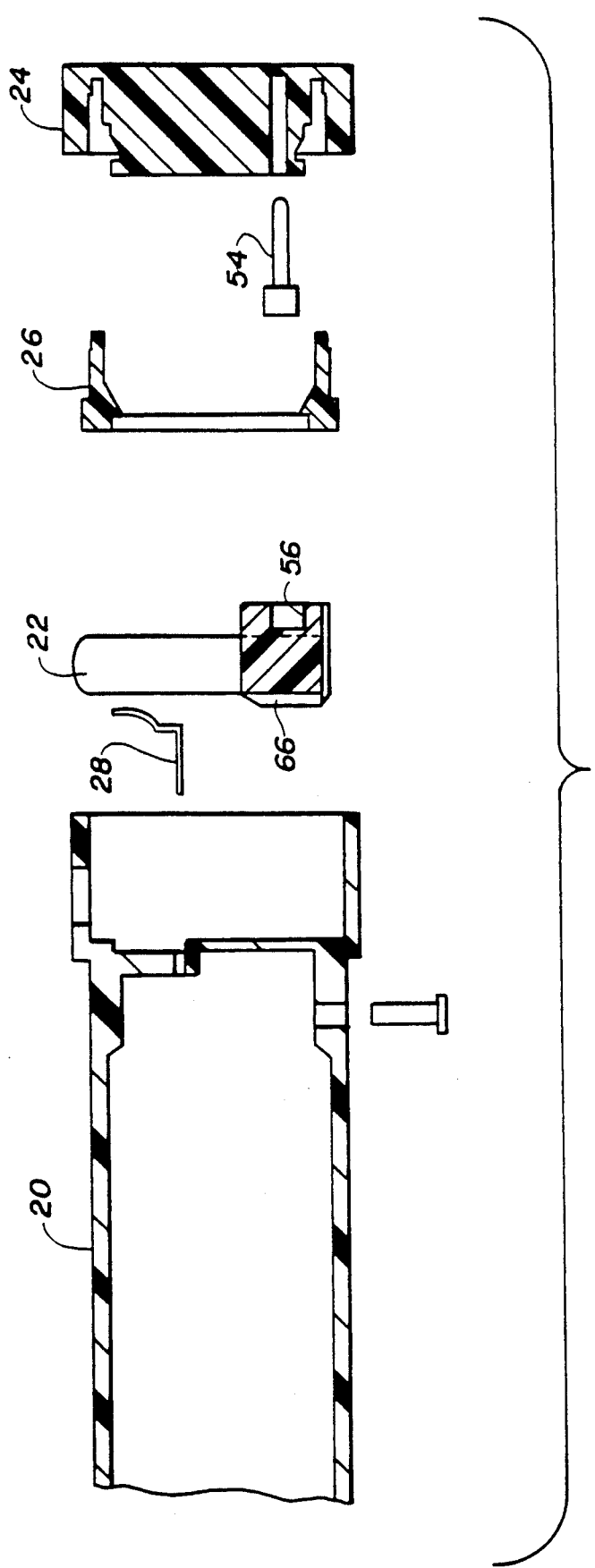
Figure 6:
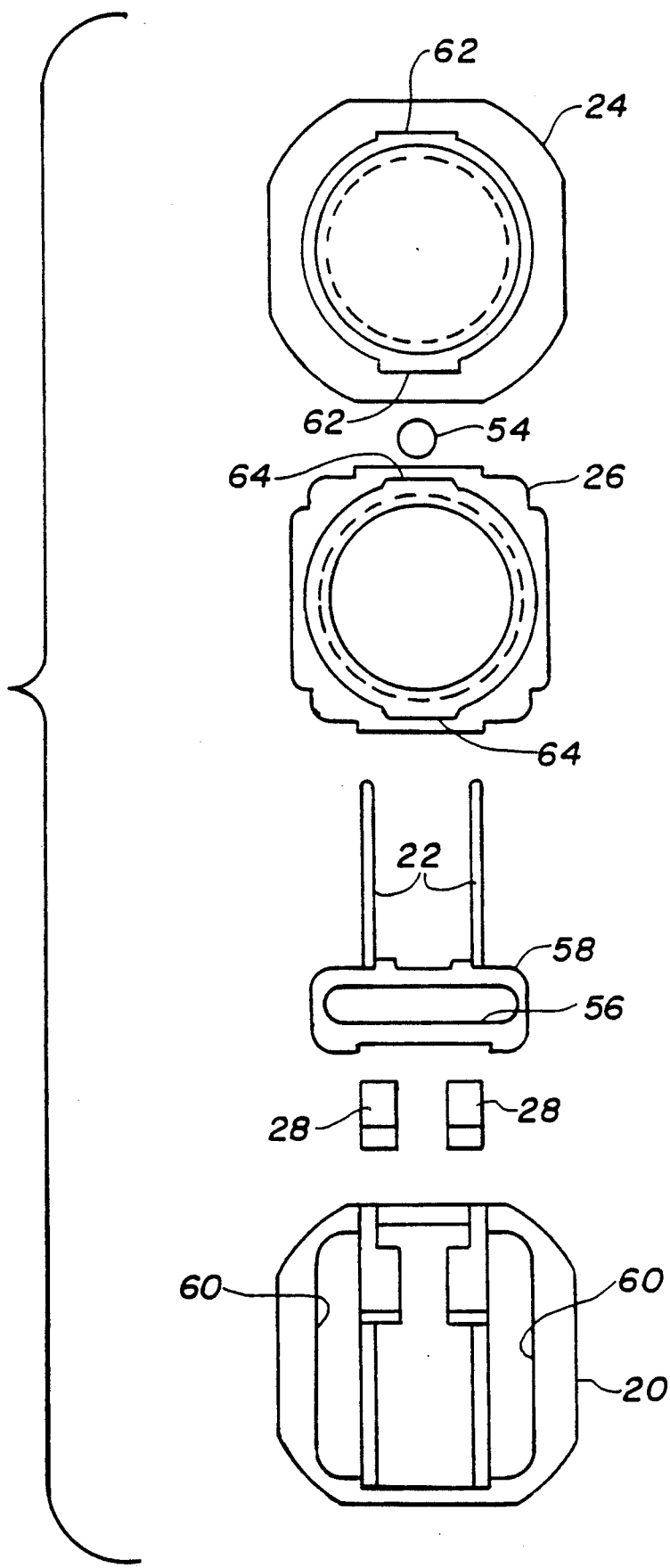
Figure 7:
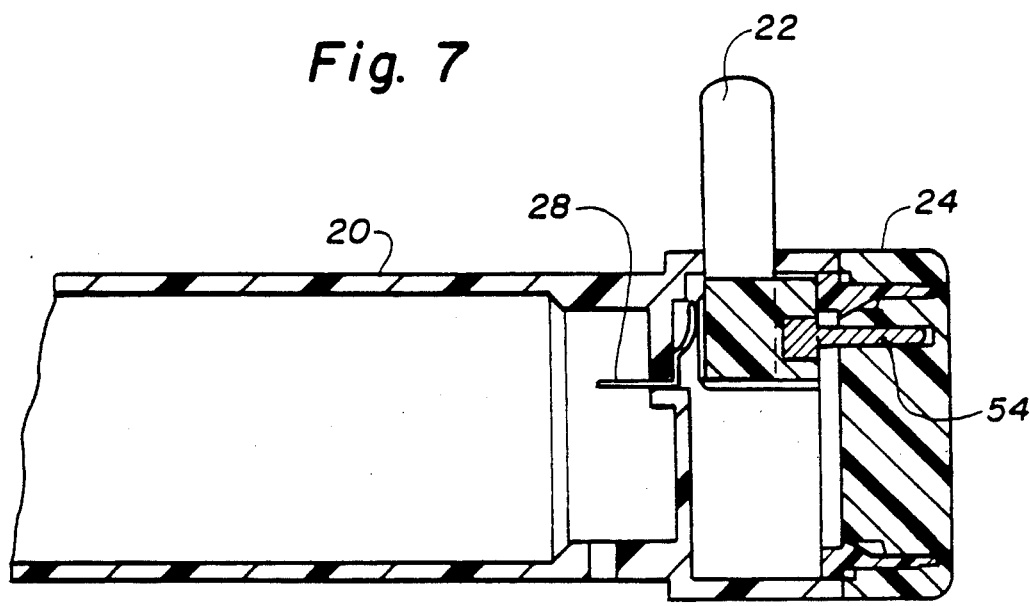
Figs. 7, 8 and 9 are sectional views of one end of the flashlight of FIG. 1 illustrating the operation of certain parts.
Figure 8:
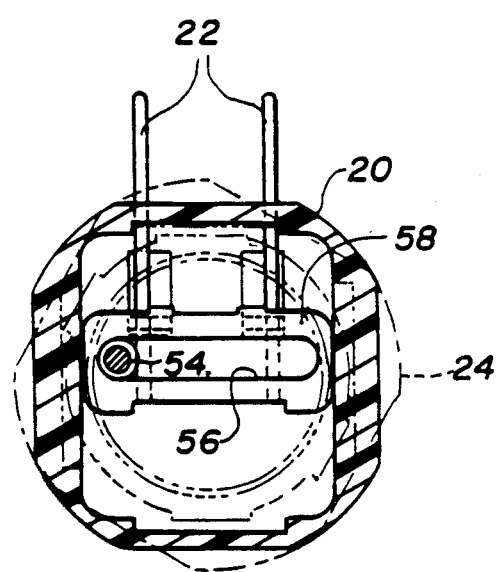
Figure 9:
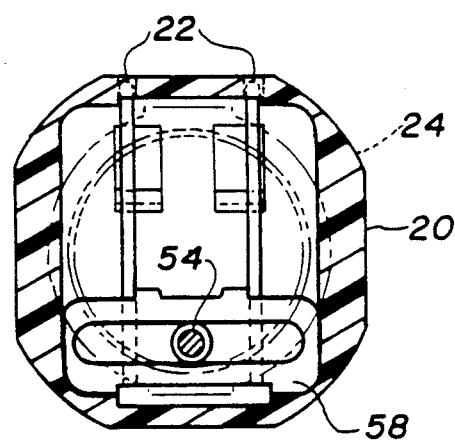

When it is desired to turn on the flashlight 10, the head assembly 18 is rotated in a clockwise direction (i.e. thread tightening as viewed from the flared end 12a of the casing 12) until the pressure pad 44 engages the bulb flange 30a and moves bulb 30 in a first direction toward batteries 36 until bulb flange 30a is moved into contact with the terminal inner flange 48aas seen in FIG. 1c. This completes an electrical circuit connecting the bulb 30 and the batteries 36 thereby illuminating the bulb 30. Continued rotation of the head assembly 18 in the same clockwise direction focuses the light emitted by the bulb 30 by moving the reflector 14 relative to the bulb filament 30b as seen in Fig 1d. Still further rotation of the head assembly 18 in the same clockwise direction results in a wide angle beam of light from the bulb 30. The O-ring 50 provides sufficient friction to retain the head assembly 18 in any adjusted position.

Subsequent rotation of the head assembly 18 in a counter clockwise direction (i.e. thread untightening as viewed from the casing flared end 12a) permits bulb 30 to be moved in a second direction away from batteries 36 so that the bulb flange 30a is moved away from the terminal inner flange 48a by the spring 39 as seen in FIG. 1b The middle coils of the spring 39 are captured in grooves 35 in the socket member 32. Spring 39 provides a circular electrical contact with the center terminal 31 of bulb 30 and with a terminal plate 52 which is in contact with a terminal of one of the batteries 36. An electrical lead 53 extends between circuit board 38 and second terminal 48.

Spring 46 is partially compressed during assembly into head assembly 18 with sufficient preloaded force to urge the bulb flange 30a into contact with the terminal inner flange 48a by compressing the spring 39 without further changing the preloaded length of spring 46. Pressure pad 44 is located at a point approximately equal to the distance between the bulb flange 30a and the bulb filament 30b when the position of the bulb filament 30b coincides with the focal point of the reflector 14.

During assembly of flashlight 10, mating ends of shell 34 and partition member 20 slide together and become permanently locked in place. Partition member 20 has a first compartment 21 for containing the circuit board 38 and a second compartment 23 for housing the prongs 22. The prongs 22 are extended from and retracted into the compartment 21 by rotating the knob 24. The exterior shape of the knob 24 matches the exterior shape of the adjacent end of partition member 20. That is, the exterior adjoining shapes of the knob 24 and the partition member 20 are generally in the form of a square with rounded corners and flat surfaces. The flat surface of the partition member 20 through which the prongs 22 are extended may be pushed directly against a conventional electrical receptacle.

The two electrical leads 28 are preferably molded into the partition member 20 for engagement with the prongs 22 when fully extended. The prongs 22 are assembled within the compartment 23 of partition member 20 and guide member 26 is preferably welded ultrasonically into the partition member 20 after the prongs 22 are inserted in compartment 23. Knob 24 and cam roller 54 are then pressed together and permanently retained on casing 12 by inserting locking ring 27 on guide member 26 into mating groove 25 in knob 24.

To recharge the batteries 36, the knob 24 is rotated ½ revolution (180 degrees) in either direction. The cam roller 54 mounted in the knob 24 is engaged in a cam slot 56 molded into a base 58 supporting the prongs 22. As knob 24 is rotated, the cam roller 54 lifts the prongs 22 out of their compartment 23 in the partition member 20 and through the slots in one the flat surfaces of the partition member 20. The prong base 58 is supported for sliding movement in a channel or keyway formed by guiding surfaces 60 molded within partition member 20. As the knob 24 is rotated through ½ revolution, it leaves its matching relationship with the partition member 20 but returns to such matching relationship as it snaps into place at the completion of ½ revolution. Internal flats 62 on knob 24 detent against external flats 64 on guide member 26 to hold the knob 24 in position with the prongs 22 fully extended. As the prongs 22 approach the extended position, electrical contact is made between the leads 28 and bosses 66 on the prongs 22. This electrical contact provides a path for the alternating current when prongs 22 are plugged into a receptacle. When the circuit board 38 is energized by the alternating current, an LED displays light through a fibre optic or acrylic member 68 thus indicating a recharging mode.

For the flashlight 10 to again function as a portable light source, the prongs 22 are removed from the receptacle and the knob 24 is rotated ½ revolution in either direction thereby returning the prongs 22 to their retracted position within the compartment 23 of partition member 20. The bosses 66 on the prongs 22 are moved out of contact with the leads 28.

The circuit board 38 intended for use in the flashlight 10 is of conventional design and includes various components. These components consist of diodes, rectifiers, resistors, capacitors, and printed circuits to provide conversion of alternating current to direct current for recharging the batteries 36, for preventing overcharging of the batteries 36, for indicating the recharging mode, and for protection against short circuits.

The flashlight 10 is hermetically sealed by conventional means such as O-ring 50 between casing 12 and cap 17, and gasket 70 between lens 16 and cap 17. This protects the bulb 30, batteries 36 and circuit board 38 from moisture and other contaminants.

It will be understood that the self contained, retractable prong, recharging system of the flashlight 10 is adaptable to many hand held electrical devices intended for operation with rechargeable batteries.

What is claimed is:

1. A flashlight comprising:
    a casing containing at least one battery;
    a bulb slidably disposed in a socket member carried in said casing, said bulb having an annular flange forming an electrical terminal;
    a head assembly rotatably mounted on one end of said casing and having means arranged for engaging said annular flange for moving said bulb in a first direction toward said battery and for moving said annular flange into contact with another electrical terminal in said casing thereby closing an electrical circuit connecting said battery and said bulb in order to illuminate said bulb, said head assembly forming no part of said electrical circuit; and
    a spring disposed between said battery and said bulb for urging said bulb in a second direction away from said battery and for moving said annular flange out of contact with said another electrical terminal thereby opening said electrical circuit and extinguishing said bulb.

2. The flashlight or claim 1, wherein said means for engaging said annular flange comprises a preloaded pressure pad carried on said head assembly.

3. The flashlight of claim 2, wherein said means for engaging further comprises another spring which is partially compressed for urging said preloaded pressure pad against a flange on said head assembly.

4. The flashlight of claim 3, wherein said another spring is preloaded when said head assembly is assembled.

5. The flashlight of claim 1, wherein said socket member has an upper end arranged for limiting movement of said bulb in said first direction and a lower end arranged for limiting movement of said battery in said second direction.

6. The flashlight of claim 1, wherein said spring also maintains electrical contact between said battery and a further electrical terminal on said bulb.

* * * * *